(12) United States Patent
Hao et al.

(10) Patent No.: US 7,714,876 B1
(45) Date of Patent: May 11, 2010

(54) METHOD AND SYSTEM FOR CREATING VISUALIZATIONS (75) Inventors: Ming C. Hao, Palo Alto, CA (US); Mustazirul Islam, Roseville, CA (US); Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 78 days.

(21) Appl. No.: 11/076,700

(22) Filed: Mar. 10, 2005

(51) Int. Cl.
G09G 5/00 (2006.01)
G06T 11/20 (2006.01)

(52) U.S. Cl. ...................... 345/619; 345/440
(58) Field of Classification Search ................ 345/440, 345/440.2, 619; 715/700, 788
See application file for complete search history.

(56) References Cited

U.S. PATENT DOCUMENTS

| | | | |
|---|---|---|---|
| 5,581,797 A | 12/1996 | Baker | |
| 5,623,590 A | 4/1997 | Becker | |
| 5,659,768 A | 8/1997 | Forbes | |
| 5,742,778 A | 4/1998 | Hao et al. | |
| 5,801,688 A | 9/1998 | Mead | |
| 5,828,866 A | 10/1998 | Hao et al. | |
| 5,929,863 A | 7/1999 | Tabei | |
| 5,986,673 A | 11/1999 | Martz | |
| 6,222,547 B1 * | 4/2001 | Schwuttke et al. | 345/440 |
| 6,269,325 B1 | 7/2001 | Lee | |
| 6,301,579 B1 * | 10/2001 | Becker | 345/440 |
| 6,330,685 B1 | 12/2001 | Hao et al. | |
| 6,377,287 B1 | 4/2002 | Hao et al. | |
| 6,400,366 B1 | 6/2002 | Davies | |
| 6,429,868 B1 | 8/2002 | Dehner | |
| 6,658,358 B2 | 12/2003 | Hao et al. | |
| 6,700,575 B1 * | 3/2004 | Bovarnick et al. | 345/440 |
| 6,700,590 B1 | 3/2004 | DeMesa | |
| 6,704,016 B1 * | 3/2004 | Oliver et al. | 345/440.2 |
| 6,711,577 B1 * | 3/2004 | Wong et al. | 345/419 |
| 6,727,926 B1 | 4/2004 | Utsuki | |
| 6,937,238 B2 | 8/2005 | Hao | |
| 7,038,680 B2 * | 5/2006 | Pitkow | 345/440 |
| 7,046,247 B2 | 5/2006 | Hao | |
| 7,051,284 B2 | 5/2006 | Uemura | |
| 7,218,325 B1 | 5/2007 | Buck | |
| 7,221,474 B2 | 5/2007 | Hao | |
| 2002/0054158 A1 | 5/2002 | Asami | |
| 2002/0067381 A1 | 6/2002 | Hugh | |
| 2002/0078086 A1 | 6/2002 | Alden et al. | |
| 2002/0174087 A1 | 11/2002 | Hao et al. | |
| 2003/0011601 A1 * | 1/2003 | Itoh et al. | 345/440 |
| 2003/0071815 A1 | 4/2003 | Hao et al. | |
| 2003/0128212 A1 * | 7/2003 | Pitkow | 345/440 |
| 2003/0152288 A1 | 8/2003 | Balmelli | |
| 2003/0169295 A1 | 9/2003 | Becerra, Jr. | |

(Continued)

OTHER PUBLICATIONS

Hua Liu et al., "Rule-based visualiztion in the Discover computational steering collaboratory", 2004, p. 1-10.*

(Continued)

*Primary Examiner*—Chante Harrison (57) ABSTRACT

There is provided a method and an apparatus for creating visualizations. Specifically, there is provided a computer-implemented method for creating visualizations, the method comprising importing data, generating an interaction rule for the data, and creating a visualization using the data and the interaction rule. An apparatus for implementing the method is also provided.

24 Claims, 9 Drawing Sheets

U.S. PATENT DOCUMENTS

| | | | |
|---|---|---|---|
| 2003/0208323 | A1 | 11/2003 | Hao et al. |
| 2003/0214504 | A1 | 11/2003 | Hao et al. |
| 2003/0227484 | A1 | 12/2003 | Hao et al. |
| 2004/0078378 | A1 | 4/2004 | Bala |
| 2004/0085316 | A1* | 5/2004 | Malik .......................... 345/440 |
| 2004/0169654 | A1* | 9/2004 | Walker et al. ............... 345/440 |
| 2004/0183799 | A1 | 9/2004 | Hao et al. |
| 2004/0205450 | A1 | 10/2004 | Hao et al. |
| 2004/0252128 | A1 | 12/2004 | Hao et al. |
| 2005/0088441 | A1 | 4/2005 | Hao |
| 2006/0059439 | A1 | 3/2006 | Hao |
| 2006/0156246 | A1* | 7/2006 | Williams et al. ............ 715/764 |
| 2007/0101268 | A1 | 5/2007 | Hua |

OTHER PUBLICATIONS

Javid Alimohideen et al., "PAVIS—Pervasive Adaptive Visualization and Interaction Service", Dec. 2005, p. 1-5.*

D. Keim, M. C. Hao, J. Ladisch, M. Hsu, U. Dayal, "Pixel Bar Charts: A New Technique for Visualizing Large Multi-Attribute Data Sets without Aggregation", HP Technical Report, Apr. 11, 2001, pp. 1-10.

M. Ankerst, M. Ester, H.-P. Kriegel, "Towards an effective cooperation of the computer and the user for classification", Proc. 6th Int. Conf. On Knowledge Discovery and Data Mining, (KDD 2000), Aug. 20-23, 2000, Boston, MA, 2000, pp. 1-10.

M.C. Hao, J. Ladisch, U. Dayal, M. Hsu, A. Krug; "Visual Mining of E-customer Behavior Using Pixel Bar Charts", HP Technical Report, Jun. 20, 2001, pp. 1-7.

D. A. Keim, "Designing Pixel-oriented Visualization Techniques: Theory and Applications", IEEE Transactions on Visualization and Computer Graphics, vol. 6, No. 1, Jan.-Mar. 2000, pp. 1-20.

M. Sifer, "Query Web Site Visitor Trend Data with Coordinated Nested Bar and Pie Charts", Proc. of the Pan-Sydney area Workshop on Visual Info. Proc., May 2001, Sydney, Australia, pp. 1-2.

M.C. Chuah et al., "Dynamic Aggregation with Circular Visual Designs," School of Computer Science, Carnegie Mellon University, pp. 1-9 (1998).

D.A. Kelm et al., "Hierarchical Pixel Bar Charts," IEEE Transactions on Visualization and Computer Graphics, vol. 8, No. 3, pp. 255-269 (Jul.-Sep. 2002).

J.V. Carlis et al., "Interactive Visualization of Serial Periodic Data," Proceedings of UIST '98, 11th Annual Symposium on User Interface Software and Technology, pp. 1-10 (Nov. 1998).

S. G. Eick et al., "Visual Scalability," Technical Report No. 106, National Institute of Statistical Sciences, pp. 1-27 (Jun. 2000).

G.W. Furnas, "Generalized Fisheye Views," Human Factors in Computing Systems CHI '86 Conference Proceedings, pp. 16-23 (1 986).

D.A. Kelm et al., "Recursive Pattern: A Technique for Visualizing Very Large Amounts of Data," Proceedings of the 6th IEEE Visualization Conference, pp. 279-286 (1995).

A. Aris et al., "Representing Unevenly-Spaced Time Series Data for Visualization and Interactive Exploration," pp. 1-12 (2005).

M. Weber et al., "Visualizing Time-Series on Spirals," pp. 1-6 (2001).

L. Wei et al., "Assumption-Free Anomaly Detection in Time Series," University of California—Riverside, Department of Computer Science & Engineering, pp. 1-4 (2005).

B. Shneiderman, "Tree Visualization with Treemaps: a 2-D Space-Filling Approach", ACM Transactions on Graphics, vol. 11, No. 11, pp. 92-99, Jan. 1992.

R. Rao et al., http://sigchi.org/chi95/proceedings/videos/rr_bdy.htm (4 pages) 1995.

U.S. Appl. No. 09/982,481, Examiner's Answer dated Sep. 3, 2008, pp. 1-68.

U.S. Appl. No. 09/982,481, Non-Final Rejection dated Apr. 4, 2008, pp. 1-58 and attachments.

U.S. Appl. No. 09/982,481, Final Rejection dated Sep. 5, 2007, pp. 1-43.

U.S. Appl. No. 09/982,481, Non-Final Rejection dated May 8, 2007, pp. 1-33.

U.S. Appl. No. 09/982,481, Final Rejection dated Nov. 14, 2006, pp. 1-22.

U.S. Appl. No. 09/982,481, Non-Final Rejection dated Jul. 26, 2006, pp. 1-19 and attachments.

U.S. Appl. No. 09/982,481, Final Rejection dated Jan. 25, 2006, pp. 1-17 and attachments.

U.S. Appl. No. 09/982,481, Non-Final Rejection dated Oct. 4, 2005, pp. 1-11 and attachments.

U.S. Appl. No. 09/982,481, Examiner's Answer dated Jun. 1, 2004, pp. 1-16.

U.S. Appl. No. 09/982,481, Final Rejection dated Dec. 17, 2003, pp. 1-13.

U.S. Appl. No. 09/982,481, Non-Final Rejection dated Aug. 27, 2003, pp. 1-9 and attachments.

* cited by examiner

| Customer | Service Name | Target | SLO violations | Availability | Setup Time | Response Time | Date/Time |
|---|---|---|---|---|---|---|---|
| Provider1 | InternetServices | www.hpshopping.com/ | 0 | 0 | 0.46 | 0 | 10/5/2003 1:45 |
| Provider 1 | InternetServices | www.hpshopping.com/ | 0 | 0 | 0.39 | 0 | 10/5/2003 3:30 |
| ... | ... | ... | ... | ... | ... | ... | ... |
| Provider2 | TelecomService | www.att.com/ | 0 | 0 | 0.75 | 0 | 10/5/2003 0:00 |
| Provider2 | TelecomService | www.att.com/ | 0 | 0 | 0.79 | 0 | 10/5/2003 0:45 |
| ... | ... | ... | ... | ... | ... | ... | ... |
| Provider2 | EmailService | www.hotmail.com/ | 0 | 0 | 0.56 | 0 | 10/5/2003 2:00 |
| Provider2 | EmailService | www.hotmail.com/ | 0 | 0 | 0.75 | 0 | 10/5/2003 2:15 |
| ... | ... | ... | ... | ... | ... | ... | ... |
| Provider2 | InternetServices2 | www.sbc.com/ | 0 | 0 | 0.53 | 0 | 10/5/2003 1:00 |
| Provider2 | InternetServices2 | www.sbc.com/ | 0 | 0 | 0.56 | 0 | 10/5/2003 2:00 |
| ... | ... | ... | ... | ... | ... | ... | ... |
| Provider1 | InternetServices | www.hpshopping.com/ | 1 | 0 | 0.39 | 0.62 | 10/7/2003 22:45 |
| Provider1 | InternetServices | www.hpshopping.com/ | 1 | 0 | 0.39 | 0.62 | 10/7/2003 22:45 |
| ... | ... | ... | ... | ... | ... | ... | ... |
| Provider1 | WirelessService | www.attws.com/ | 1 | 1 | 0.65 | 41.6 | 10/5/2003 0:30 |
| Provider1 | WirelesssService | www.attws.com/ | 1 | 1 | 0.59 | 41.6 | 10/5/2003 7:30 |
| ... | ... | ... | ... | ... | ... | ... | ... |
| Provider1 | InternetServices | www.hpshopping.com/ | 1 | 0 | 0.5 | 41.6 | 10/7/2003 21:30 |
| Provider1 | InternetServices | www.hpshopping.com/ | 1 | 1 | 0.53 | 41.6 | 10/8/2003 0:30 |
| ... | ... | ... | ... | ... | ... | ... | ... |
| Provider2 | TelecomService | www.att.com/ | 1 | 0 | 0.45 | 41.6 | 10/8/2003 14:30 |
| Provider2 | TelecomService | www.att.com/ | 1 | 1 | 0.71 | 41.6 | 10/9/2003 0:30 |

METHOD AND SYSTEM FOR CREATING VISUALIZATIONS

BACKGROUND

This section is intended to introduce the reader to various aspects of art, which are related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Graphical visualizations, such as bar charts or line charts are commonly used to display data streams. Financial data such as stock market information and status information about a computer network are two examples of data that a user may desire to view graphically. For large amounts of data, first layer visualizations are typically not detailed enough to effectively display the data stream. For this reason, second layer, third layer, or even lower layer (i.e. more detailed) visualizations can also be created to provide increased resolution of the data within the data stream. For complex or large data streams, the creation of meaningful visualizations is often difficult and burdensome.

The visualizations mentioned above are created many ways. First, the lower layer visualizations can be created by pre-programming a software program to display a pre-defined sequence of visualizations. For example, in a financial context, the user programs the software to display a first layer visualization of stock market performance and then to display lower layer visualizations of certain pre-selected stocks. While this technique permits display of detailed information from the data stream, it disadvantageously limits the display to only the pre-selected data (i.e., the specific stocks pre-selected by the user). A second type of sequence of visualizations permits a user to manually drill down to a lower layer visualizations by selecting a portion of the first layer (or lower layer) visualization to expand. While this technique permits the creation of lower layer visualizations that display the specific information desired by a user, this technique often involves manual interaction with the first layer visualization and thus is not often suitable for automated reporting.

BRIEF DESCRIPTION OF THE DRAWINGS

Advantages of one or more disclosed embodiments will become apparent upon reading the following detailed description and upon reference to the drawings in which.

DETAILED DESCRIPTION

One or more specific embodiments of the present technique will be described below. In an effort to provide a concise description of these embodiments, not all features of an actual implementation are described in the specification. It should be appreciated that in the development of any such actual implementation, as in any engineering or design project, numerous implementation specific goals, such as compliance with system-related and business-related constraints, which may vary from one implementation to another. Moreover, it should be appreciated that such a development effort might be complex and time consuming but would nevertheless be a routine understanding of design, fabrication, and manufacture for those of ordinary skill having the benefit of this disclosure.

The present application is directed towards a system that can create visualizations based on interaction rules instead of pre-selected data. These interaction rules interact with the data in the data stream to create a sequence of visualizations that are customized to the particular data in the data stream. This feature is particular advantageous in the context of automated, periodic reporting because the system interacts with the data with each periodic reporting to create visualizations that display the information that is most important to a particular user.

Figure 1:
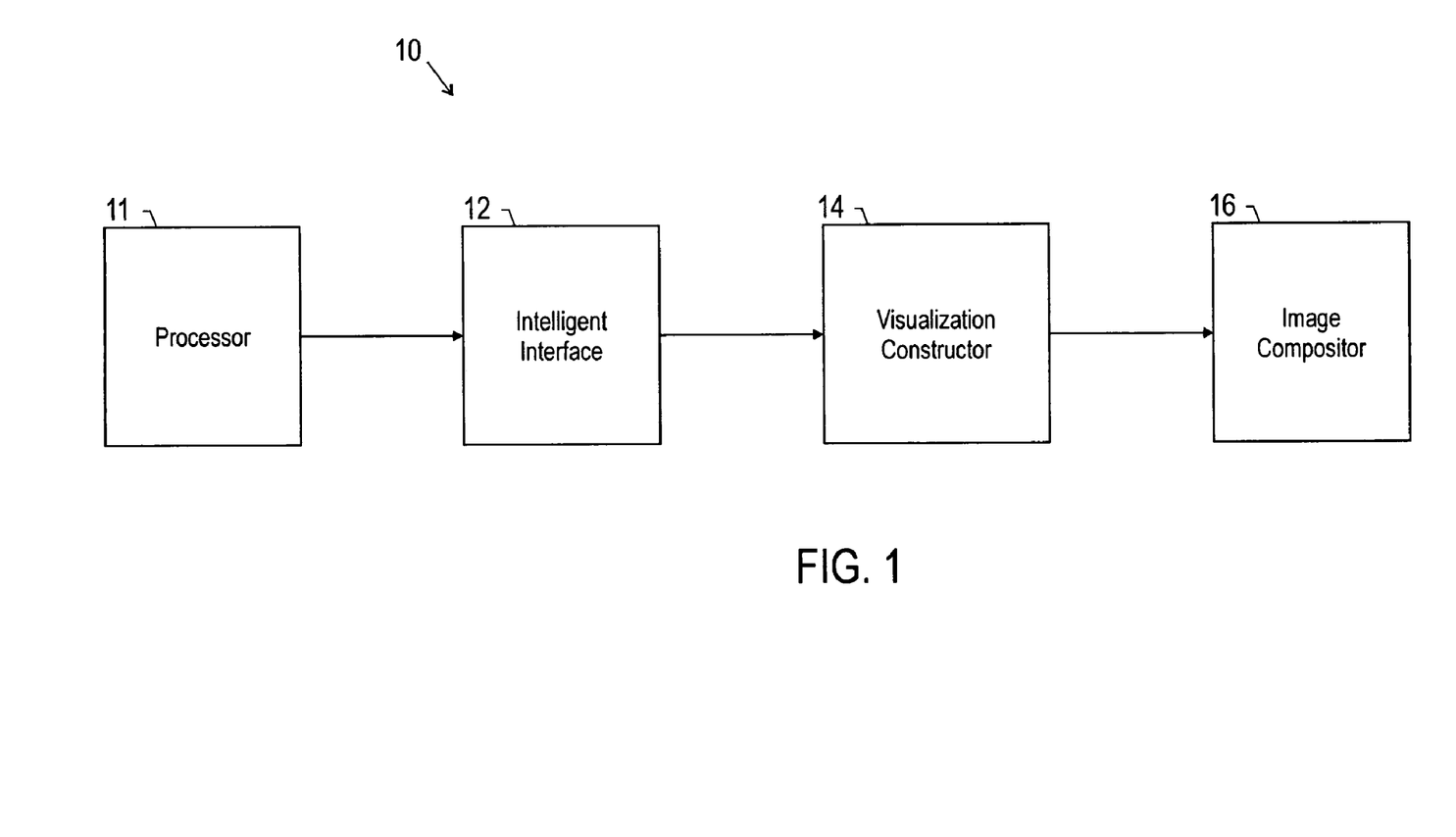
FIG. 1 is a block diagram of a computer system illustrating one embodiment of the present invention.

FIG. 1 is a block diagram illustrating one embodiment of a computer system 10. The computer system 10 includes a processor 11, an intelligent interface 12, a visualization constructor 14, and an image compositor 16. In one embodiment, the processor 11 comprises the intelligent interface 12, the visualization constructor 14, and the image compositor 16. In another embodiment, the processor 11 interacts with the intelligent interface 12, the visualization constructor 14, and the image compositor 16. The processor 11 comprises any one of a number of suitable processors. In one embodiment, the processor 11 is located within a computer system.

As will be described in greater detail below, the intelligent interface 12 interacts with the visualization constructor 14 to generate a sequence of data-driven multi-layered visualizations. The intelligent interface 12 is configured to import incoming data at a specified time interval. The intelligent interface 12 also interfaces with the visualization constructor 14 to set a color scale for the visualization and to lay out for the visualizations. In one embodiment, application interfaces ("APIs") within the intelligent interface 12 perform this task. Further, the intelligent interface 12 generates a set of interaction rules to guide the visualization constructor 14 in creating the sequence of data-driven visualizations The visualization constructor 14 constructs a sequence of multi-layered data-driven graphs and images for real-time data exploration without user interaction. This visualization technique is driven by the data instead of the user. In particular, the visualization constructor 14 generates the sequence of graphical visualizations by simulating window-like properties, such as window height, window width, window framing, and window panels. In one embodiment, the visualization constructor 14 creates the sequence of graphical visualizations with a default window configuration that is based on the origin and dimensions of the computer screen. For example, the visualization constructor 14 can create the sequence of visualization as a rectangle with an origin and dimensions of 10, 50, 1000, and 6000. In alternate embodiments, however, other window configuration based on the incoming data can be used. The visualization constructor 14 can also use drill-downs, filtering, or zooming to generate different types and levels of visualization to most efficiently display the data stream.

The image compositor 16 transforms the visualizations generated by the visualization constructor 14 into an image file, such as JPG file. In one embodiment, the image compositor 16 also exports the image files to a storage medium. In another embodiment, the image compositor 16 composes the image files into a computer slideshow. In yet another embodiment, the image compositor 16 creates an image file that permits a user to get more detailed information by pointing a graphical pointer at part of the image. In still another embodiment, the image compositor 16 composes the image files on a web page.

Those skilled in the art will appreciate that the intelligent interface 12, the visualization constructor 14, and the image compositor 16 can be hardware, firmware, software, or some combination of hardware, firmware, and software. In alternate embodiments, the intelligent interface 12, the visualization constructor 14, and the image compositor 16 do not necessarily solely comprise the functions as illustrated. In other words, the functions attributed to the intelligent interface 12, the visualization constructor 14, and the image compositor 16 are merely one example and other embodiments can be envisaged wherein the functions described above are split up differently or wherein some components are not included or other components are included.

Figure 2:
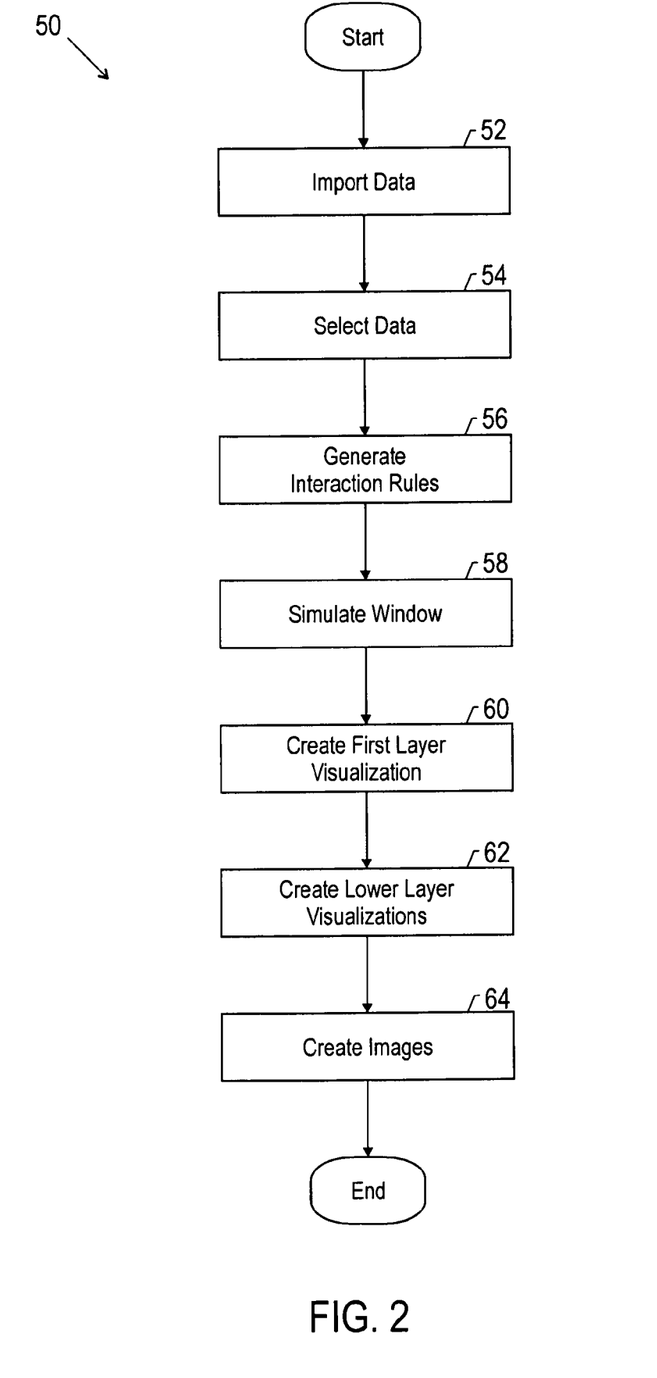
FIG. 2 is a process flow illustrating one embodiment of a process for creating a sequence of visualizations.

FIG. 2 is a process flow illustrating one embodiment of an exemplary process 50 for creating a sequence of data-driven visualizations. The process 50 begins by importing a data stream, as indicated in block 52. In one embodiment, importing the data stream comprises receiving a transmission from a data collection source. In another embodiment, importing the data stream comprises communicating with a storage medium to download the data. In some embodiments, data is imported periodically. For example, the computer system 10 can download the data stream once every fifteen minutes.

Once the data in the data stream has been imported, the process 50 continues with data selection, as indicated in block 54 of FIG. 2. Data selection is employed because the data stream can comprise more data than the user wishes to display in the sequence of graphical visualizations. For this reason, during this step of the process 50, the intelligent interface 12 can select a subset of information from the data stream to be displayed. For example, in one embodiment, data selection comprises selecting all of the data in the data stream. In alternate embodiments, data selection comprises selecting only a subset of the data in the data stream. In one embodiment, this selection is performed by a set of application interfaces ("APIs") that interface with the visualization constructor 14 to limit what data is displayed in the sequence of graphical visualizations. In addition, during the data selection process, the intelligent interface 12 uses the set of APIs to set a color scale and lay out a structure for the sequence of graphical visualizations. The color scale and structure for the sequence of visualizations are either be programmed in advance by the user or generated by the intelligent interface 12 based on the selected data.

Once data selection is complete, the intelligent interface 12 generates a set of interaction rules, as indicated in block 56. The interaction rules specify which visualizations will comprise the sequence of visualizations and in what order the sequence of visualizations will be displayed. The interaction rules are based both on the structure of the selected data and the selected data itself. In one embodiment, the interaction rules are generated by accessing a list of stored user preferences, determining how the data corresponds to the stored user preferences, and generating the interaction rules based on the correspondence between the data and the stored user preferences. For example, in a stock market reporting context, the user preferences could specify creating a sequence of visualizations comprising a graphical visualization of overall performance of the stock market and creating lower layer graphical visualizations for the three stocks that increased in value the most during the previous 24 hours. The intelligent interface 12 employs these user preferences to generate the interaction rules, which provide a framework that permits the visualization constructor 14 to create visualizations that are based on the data itself. This sequence of visualizations displays detailed information that is of interest to the user (i.e., information about the three stocks with the greatest increase in value) without the user having to manually select the particular stocks to be displayed.

Once generated, the interaction rules provide detailed information about what data is to be displayed in the sequence of visualizations, and thus, the interaction rules serve as a guide to the visualization constructor 14 in constructing the sequence of visualizations. In one embodiment, the interaction rules can be generated based on instructions pre-programmed into the intelligent interface 12. In alternate embodiments, the interaction rules are generated by the intelligent interface 12, itself based on the data selected.

After the interaction rules have been generated, the visualization constructor 14 simulates a window in which to construct the sequence of visualizations. In one embodiment, the visualization constructor 14 simulates a window that resembles windows created in the Microsoft Windows™ operating system. In one embodiment, this window has a height and a width that corresponds to the edges of a display and includes frames and panels that create boundaries for the window. In one embodiment, all of the visualizations in the sequence of visualizations employ windows that have similar properties. In alternate embodiments, however, the properties of the individual window will vary depending on the properties of the data being displayed in the particular graphical visualization.

Once the first layer visualization has been created, the visualization constructor 14 can create the lower level visualizations, as indicated by block 62. As stated above, the visualization constructor 14 employs the set of interaction rules generated by the intelligent interface 12 to guide the construction of the lower level visualizations. Specifically, the visualization constructor 14 creates lower level visualizations to display any data or class of data specified in the interaction rules.

Next, returning to the process 50 in FIG. 2, the visualization constructor 14 creates the first layer visualization, as illustrated in block 60. The first layer visualization is created in the window simulated by the visualization constructor 14. The first layer visualization comprises virtually any type of visualization, including, but not limited to, an icon, a graphic, a bar graph, a pie chart, a pistol chart, or a line chart. In one embodiment, the first layer visualization employs color to more effectively present data.

Figure 3:
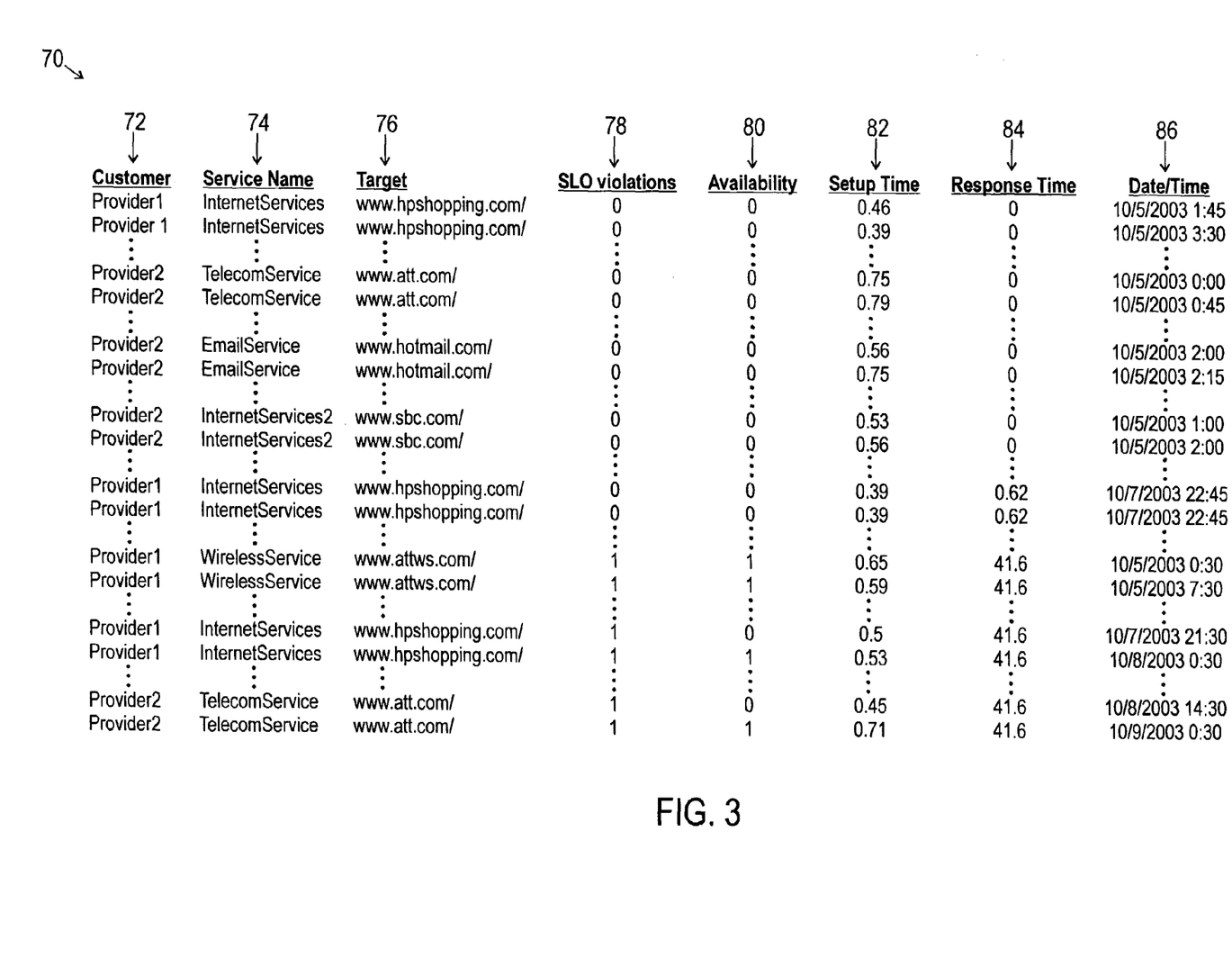
FIG. 3 illustrates one embodiment of a data stream displayed as a spreadsheet.

FIG. 3 illustrates one embodiment of an exemplary data stream 70 displayed as a spreadsheet. The data stream 70 comprises a collection of information relating to requests for Internet service. For example, as shown in the columns 72, 74, 76, the data stream 70 comprises information relating to one or more customers, one or more services provided to the customers, and one or more websites supported. Further, as seen in columns 78, 80, 82, and 84, the data stream 70 also comprises information on the number of service level object ("SLO") violations (i.e., when service was not provided within a pre-determined time threshold) for each website that was provided service (column 78). In this column, a "one" represents a SLO violation and a "zero" represents the absence of an SLO violation. The column 80 represents availability, column 82 setup time, and column 84 response time.

Lastly, column 86 represents a date/time stamp for the particular service request. Even though the data stream 70 is illustrated in FIG. 3 as a spreadsheet, those skilled in the art will appreciate that in alternate embodiments, the data stream can be stored or represented in a variety of forms, including, but not limited to, a database and a linked list. Further, it will be appreciated that the data stream is shown in an abbreviated form for illustrative purposes. In alternate embodiments, the data stream comprises a thousand or more data entries.

Figure 4:
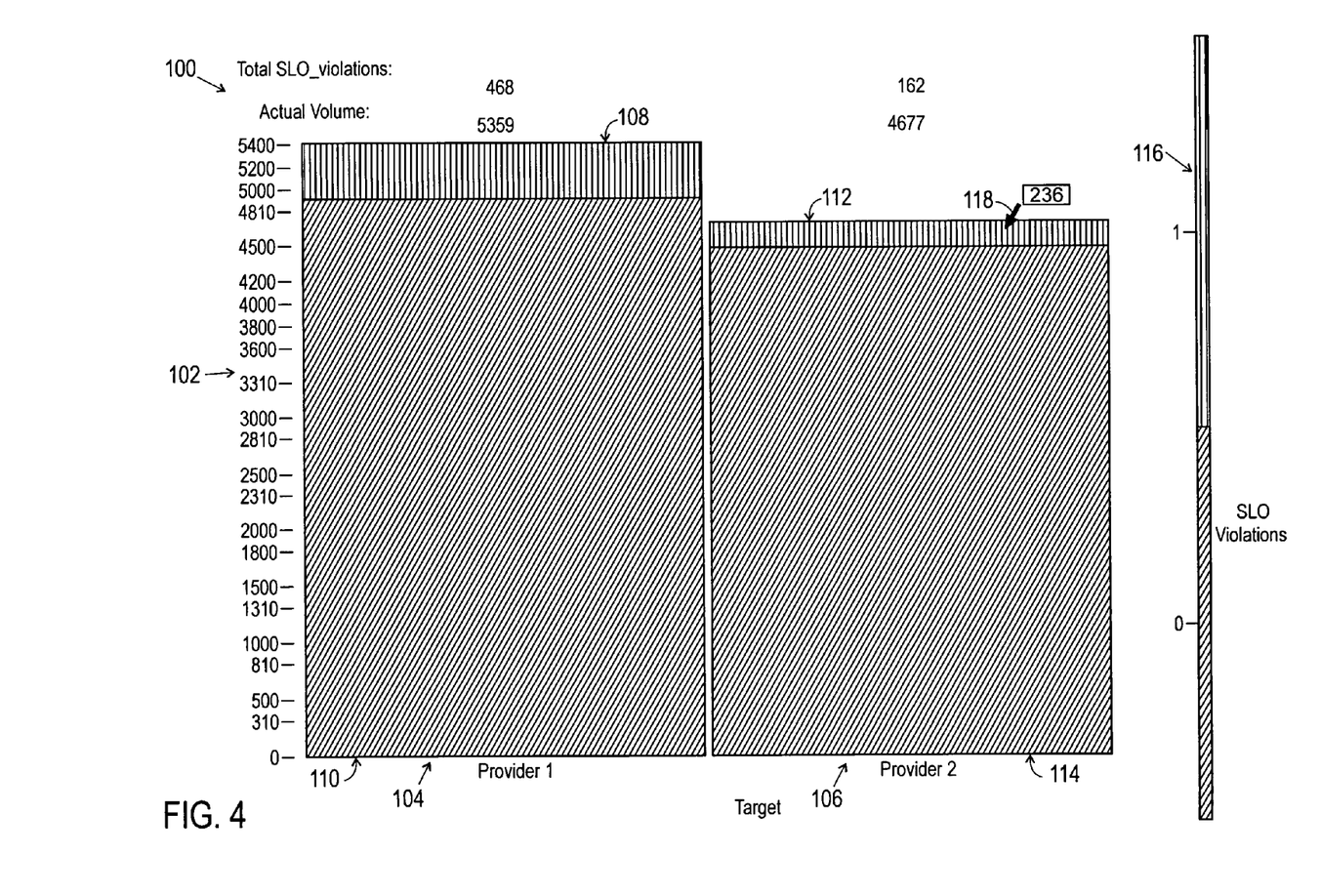
FIG. 4 illustrates one embodiment of a graphical user interface displaying an exemplary first layer visualization.
Figure 6:
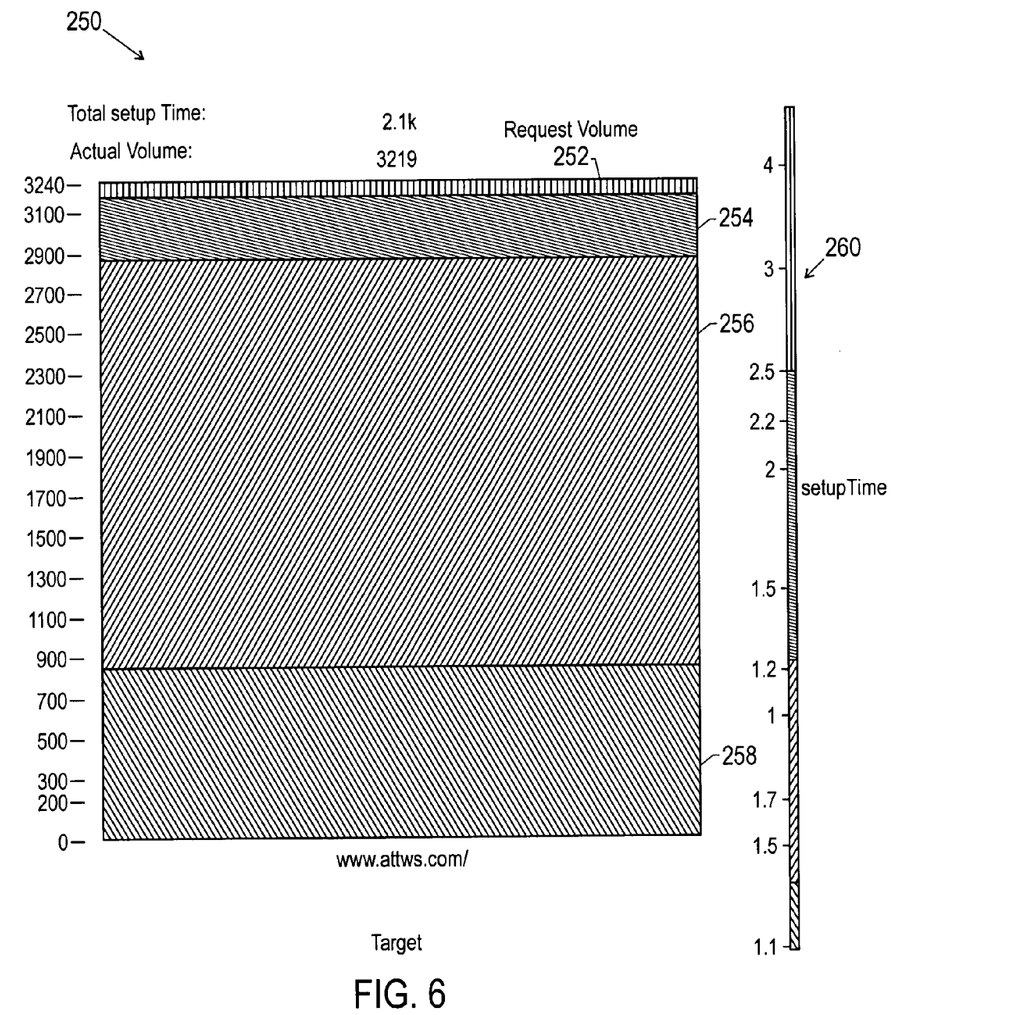
FIG. 6 illustrates one embodiment of a graphical user interface displaying an exemplary third layer visualization.
Figure 7:
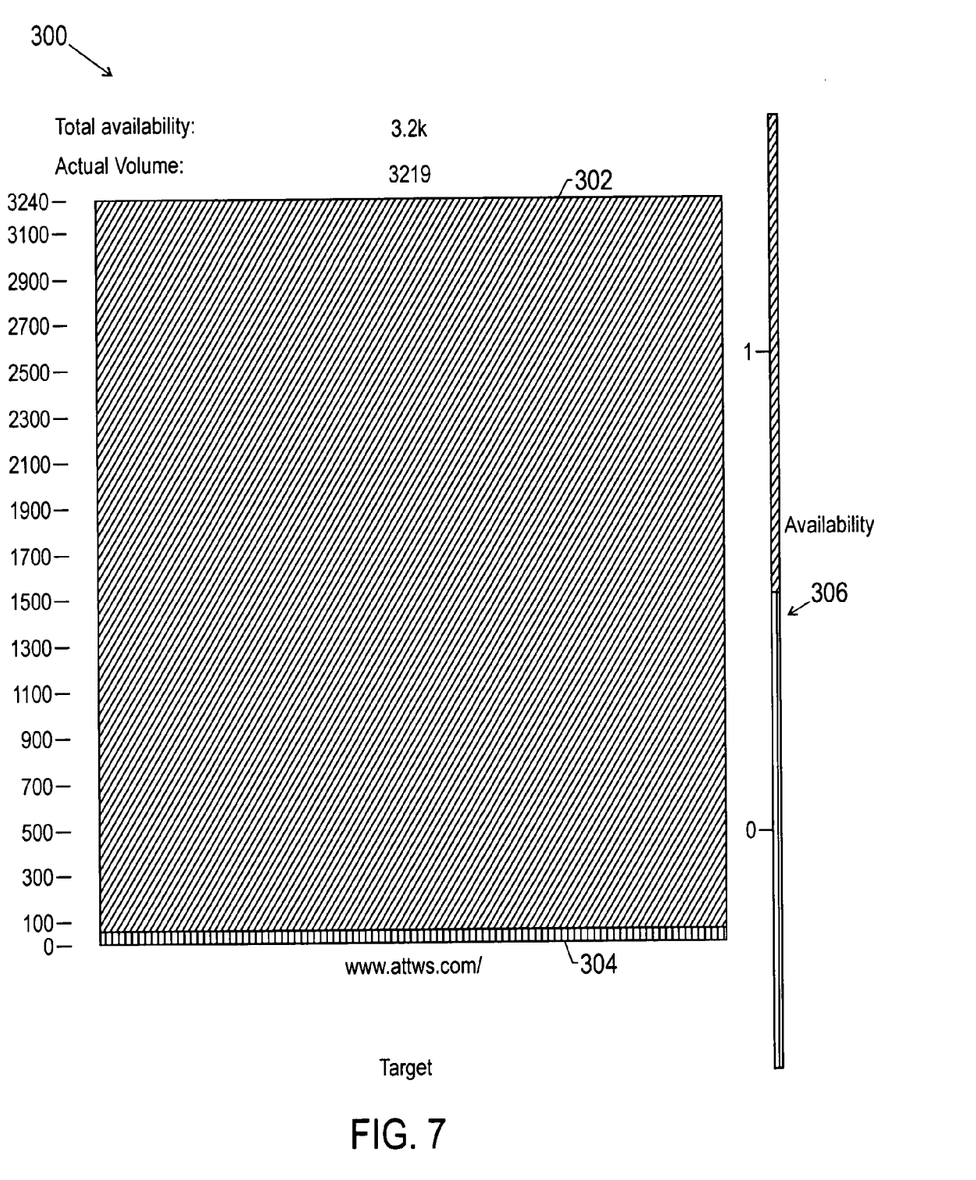
FIG. 7 illustrates one embodiment of a graphical user interface displaying an exemplary third layer visualization.

In regards to the exemplary data stream 70 illustrated in FIG. 3, the interaction rules specify which providers or which websites will be displayed in the sequence of graphical graphs. For example, the interaction rules specify creating a first layer visualization that displays the volume of service for each of the providers 1 and 2 along with the number of SLO violation (FIG. 4). Further, the interaction rules specify creating lower layer visualizations to display response time for the provider with most SLO violations (FIG. 5) and the set-up time and availability of the individual website from that provider with the worst response time (FIGS. 6 and 7).

FIG. 4 illustrates one embodiment of a graphical user interface displaying an exemplary first layer visualization 100. The first layer visualization 100 is based on the data stream 70 described in regard to FIG. 3. Further, the first layer visualization is created by employing the exemplary interaction rules discussed above. Specifically, the first layer visualization 100 displays a visualization of the total volume of service for each of the providers from the data stream 70 along with a visualization of the number of SLO violations.

In particular, the volume of service is arrayed along a y-axis 102, and the two service providers are displayed as graphical bars 104 and 106. Each of the graphical bars 104 and 106 is subdivided into two regions to represent the number of service requests to each provider that resulted in SLO violations versus the number of requests that did not result in an SLO violation. For example, the graphical bar 104 is divided into a region 108 which displays the number of requests that resulted in an SLO violation and a region 110 which represents the number of requests that were provided service. Similarly, graphical bar 106 is divided into regions 112 and 114. Those skilled in the art will appreciate that dividing the graphical bars 104 and 106 into visually distinctive regions merely adds an additional dimension to the first layer visualization 100. In alternate embodiments, the graphical bars 104 and 106 are subdivided differently or are not subdivided.

The first layer visualization 100 also comprises a legend 116 which indicates to a viewer of the first layer visualization 100 what the sub-regions of the graphical bars 104 and 106 represent. In some embodiments, the legend 116 is omitted from the first layer visualization 100. In one embodiment, the first layer visualization 100 is also configured to support pointer-driven value display. In one embodiment, when a pointer is pointed at the sub-section of the visualization, the value of a sub-section of the visualization is displayed. For example, FIG. 4 illustrates an exemplary pointer and value 118.

Those skilled in the art will also appreciate that the graphical bars 104 and 106 shown in the first layer visualization 100 are merely one technique for displaying the data stream. In alternate embodiments, other types of visualizations, such as pistol charts, line charts or pie charts, can be employed to represent the data stream. In still other embodiments, the first layer visualization is arranged hierarchically with different levels of the hierarchy displayed through differing shades or colors.

Figure 5:
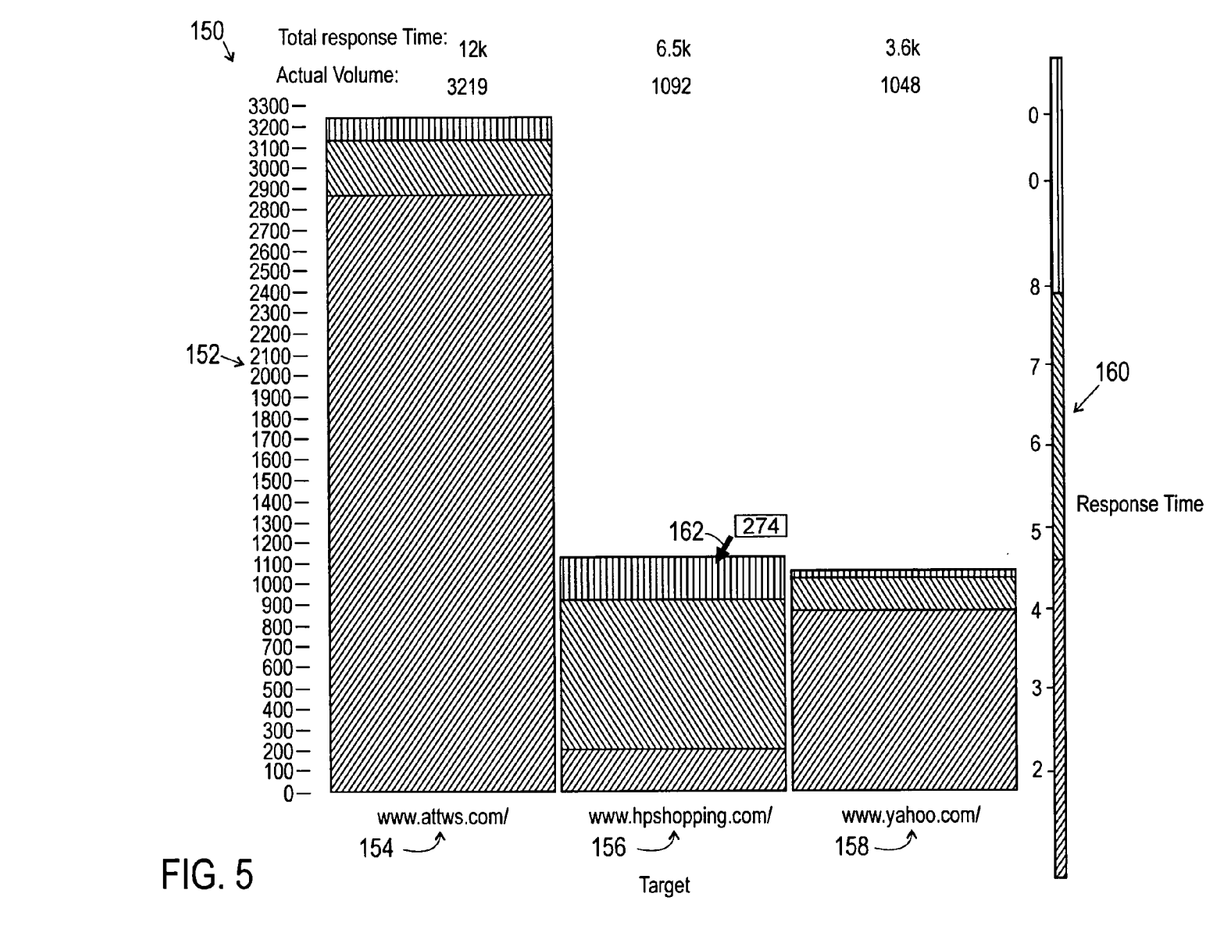
FIG. 5 illustrates one embodiment of a graphical user interface displaying an exemplary second layer visualization.

FIG. 5 illustrates one embodiment of a graphical user interface displaying an exemplary second layer visualization 150. The second layer visualization 150 is based on the data stream 70 described in regard to FIG. 3. Further, the second layer visualization 150 is created by employing the exemplary interaction rules discussed above. Specifically, the second layer visualization 150 displays the response times by website for the provider with most SLO violations. As stated above, in alternate embodiments, the interaction rules could have specified that the second layer visualization 150 be created to display any one of a number of elements of the data stream.

In one embodiment, the second layer visualization 150 expands on one of the graphical bars displayed in the first layer visualization 100. This expansion is also referred to also drilling down or creating a drilldown visualization. In the case of the second layer visualization 150, it is a drilldown graphical visualization from the graphical bar 104. As with the first layer visualization 100, the second layer visualization 150 comprises a y-axis 152, which represent the number of service requests. In the second layer visualization 150, the three websites with highest volume of service requests for provider 1 are arrayed along the x-axis. Those skilled in the art will appreciate that three websites are shown illustrative purposes only, and in alternate embodiments, the interaction rules could have specified that any one number of a number of sub-elements from the graphical bar 104 comprise the second layer visualization 150.

The second layer visualization 150 comprises graphical bars 154, 156, and 158 which represent service requests to each of the three websites. As with the graphical bars 104 and 106 shown in FIG. 4 (from column 70 of FIG. 3), the graphical bars 154, 156, and 158 are sub-divided into a series of visually distinctive regions from the graphical bar 104. In the case of the second layer visualization 150, each of the graphical bars 154, 156, and 158 is divided into a series of regions corresponding to the response time of each individual service request with the total response time displayed above each of the graphical bars 154, 156, and 158. In this embodiment, the second layer visualization 150 also comprises a legend 160 to display which usual distinctions correspond to which response times in the second layer visualization 150. Those skilled in the art will also appreciate that the graphical bars 154, 156, and 158 shown in the second layer visualization 150 are merely one technique for displaying the data stream. In alternate embodiments, other types of visualizations, such as graphics, icons, line charts, pistol charts, or pie charts, can be employed to represent the data stream. In one embodiment, the second layer visualization 150 is configured to support pointer-driven value display. In one embodiment, when a pointer is pointed at the sub-section of the visualization, the value of a sub-section of the visualization is displayed. For example, FIG. 5 illustrates an exemplary pointer and value 162.

The visualization constructor 14 (FIG. 1) can also create additional lower level visualizations to display any data or class of data specified in the interaction rules. For example, FIG. 6 illustrates one embodiment of a graphical user interface displaying an exemplary third layer visualization 250. The third layer visualization 250 displays the set-up time of the individual website from the second layer visualization 154 with the worst response time (i.e., graphical bar 154). The third layer visualization 250 illustrates four regions 252, 254, 256, and 258 representing the volume of requests corresponding to particular ranges of setup times. For example, the region 252 indicates the number of requests that had a setup time between 2.5 seconds and 4 seconds, whereas the region 258 indicates the number of requests with setup times between 1.1 seconds and 1.2 seconds. As illustrated, the third layer visualization 250 also comprises a legend 260 to indicate to a viewer what the visual indicators (e.g. colors) of each region represent. In alternate embodiments, the legend is omitted.

In further example, FIG. 7 illustrates one embodiment of a graphical user interface displaying an exemplary third layer visualization 300. The third layer visualization 300 displays information regarding the availability of the website from the second layer visualization 150 with the highest response time (i.e., the graphical bar 154). For example, the third layer visualization 300 comprises regions 302 and 304 that indicate availability for the website www.attws.com. As illustrated, the region 302 indicates availability (represented in a legend 306 as a one) and the region 304 indicates non-availability (represented in the legend 306 as a zero).

Figure 8:
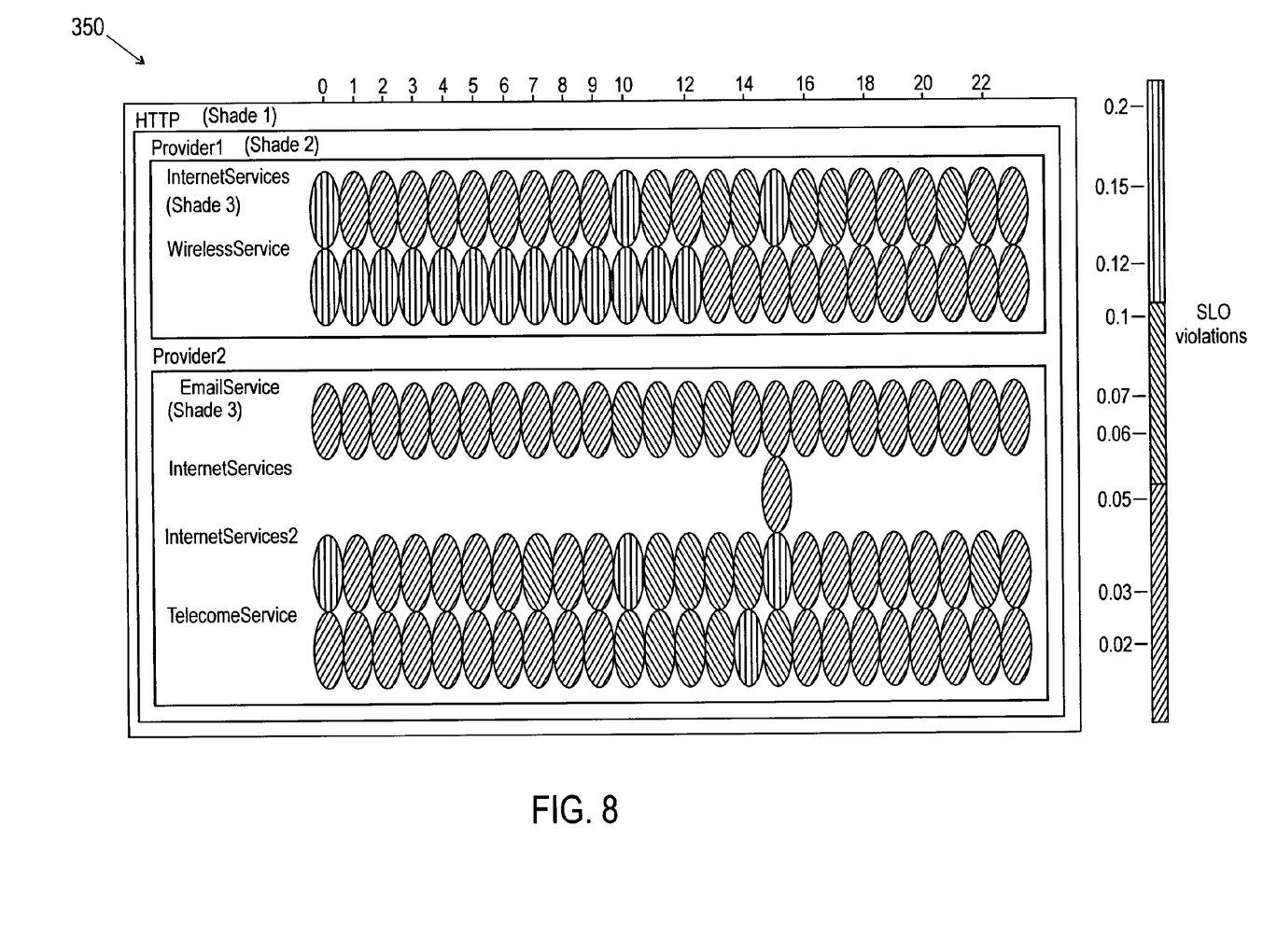
FIG. 8 illustrates one embodiment of a graphical user interface displaying an exemplary first layer visualization.
Figure 9:
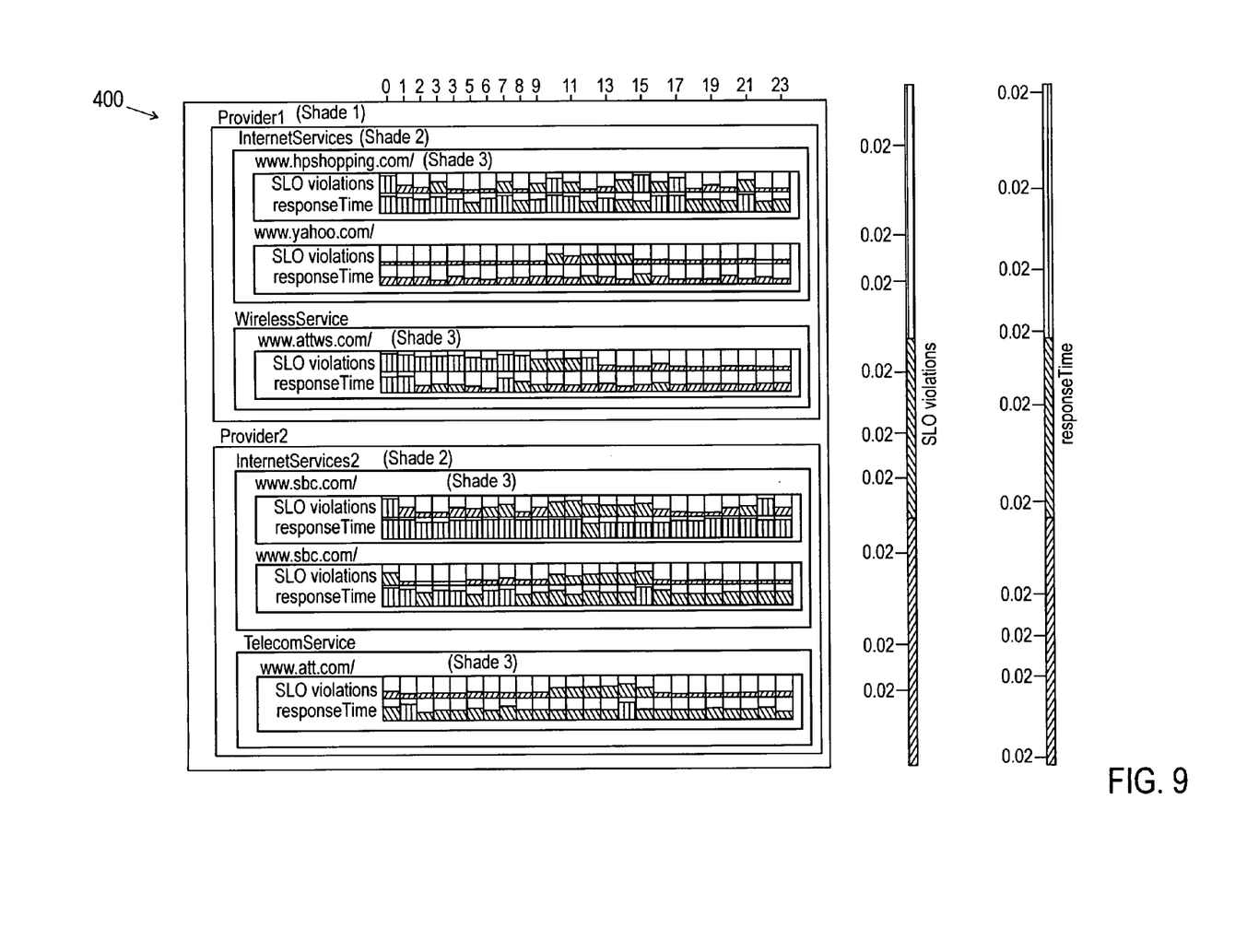
FIG. 9 illustrates one embodiment of a graphical user interface displaying an exemplary first layer visualization.

The visualization constructor 14 is also capable of creating more detailed first layer visualizations than the first layer visualization 100, if so specified in the interaction rules. For example, FIG. 8 illustrates one embodiment of a graphical user interface displaying an exemplary first layer visualization 350. Unlike the first layer visualization 100 which provided only summary data for the providers 1 and 2, the first layer visualization 350 displays more detailed information relating to the number of SLO violations for each of the services provided by each of the providers and organizes this information by date and time stamp (i.e., the numbers running across the top of first layer visualization 350). Similarly, FIG. 9 illustrates another embodiment of a graphical user interface displaying an exemplary first layer visualization 400. The first layer visualization 400 displays even more detailed information than the first layer visualization 350 by display both SLO violations and response time for each of the each of the websites of each of the providers. As illustrated in both first layer visualization 350 and first layer visualization 400, shading can be used to highlight the different providers or to bring a third dimension to the visualization.

After the visualization constructor 14 has created the sequence of visualizations, the visualization constructor 14 ranks the sequence of visualizations and places the visualizations into an order, e.g. ascending, descending, and the like, based on the relative position of the data represented in each of the visualizations in the data stream 70. In one embodiment, this ranking is used to order the sequence of visualizations for automated display in computer slide show.

Returning to FIG. 2, once the visualization constructor 14 has ranked and ordered the sequence of visualizations, the image compositor 16 transforms the sequence of visualizations into a sequence of images, as indicated by block 64. In alternate embodiments, the images are created by the visualization constructor 14. In one embodiment, the image compositor 16 also selects a foreground and background color for the image. In another embodiment, the image compositor 16 can also enlarge or shrink the size of each image. In yet another embodiment, the image compositor 16 can save the images as a sequence of image files, such as JPG files, or compiles the images into a presentation, such as a computer displayed slideshow. In still another one embodiment, this slideshow can be automated and thus configured to display each of the images for a predetermined amount of time. In another embodiment, the image compositor 16 creates an image in which a user is able to get more detailed information from the image by pointing a graphical pointer at a part of the image. In still another embodiment, the image compositor 16 stores the images on a storage medium, such as a shared disk drive. In a final embodiment, the image compositor 16 composes the images for display on either an internal web page or a World Wide Web page.

While the invention can be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for creating visualizations, the method comprising:
   importing, by a processor, data from a data stream at a time interval;
   automatically generating, by the processor, an interaction rule for the data, wherein generating the interaction rule for the data comprises:
      accessing stored user preferences that specify creation of a sequence of visualizations of the data;
      determining how the data corresponds to the stored user preferences; and
      generating the interaction rule based on the correspondence between the data and the stored user preferences;
   creating, without user interaction by the processor, the visualizations and an order of display using the data and the interaction rule, wherein the interaction rule specifies the order of display of the visualizations; and
   displaying the visualizations sequentially based on the order of display.

2. The method of claim 1, further comprising displaying a value of a sub-section of a given one of the visualizations when a pointer is pointed at the sub-section of the given visualization.

3. The method of claim 1, wherein creating the visualizations using the data and the interaction rule comprises creating a first layer visualization and a second layer visualization, wherein the second layer visualization is a drilldown from the first layer visualization.

4. The method of claim 1, comprising incorporating the visualizations into a slideshow for display on a computer display.

5. The method of claim 1, wherein creating the order of display comprises defining a sequence of multi-layered visualizations based on the data.

6. The method of claim 1, wherein creating the visualizations comprises creating visualizations selected from among a bar chart, an icon, a graphic, a pie chart, a pistol chart, or a line chart.

7. The method of claim 1, wherein creating the visualizations comprises creating a hierarchical visualization.

8. The method of claim 1, wherein importing the data comprises importing the entire data stream.

9. The method of claim 1, wherein the data comprises reporting data for a computer network.

10. The method of claim 1, wherein creating the visualizations comprises creating visualizations of financial market performance.

11. The method of claim 1, wherein generating the interaction rule comprises generating a rule that specifies creating a visualization displaying two service providers.

12. A computer system for providing a graphical representation of data, the computer system comprising:
   a processor;
   an interface configured to import data and automatically generate an interaction rule using the data by:
      accessing stored user preferences that specify creation of a sequence of visualizations of the data;
      determining how the data corresponds to the stored user preferences; and
      generating the interaction rule based on the correspondence between the data and the stored user preferences; and a visualization constructor configured to interact with the processor to create, without user interaction, the visualizations and an order of display using the data and the interaction rule, wherein the interaction rule specifies the order of display of the visualizations; and a display configured to display the visualizations sequentially based on the order of display.

13. The computer system of claim 12, comprising an image compositor configured to create an image using at least one of the visualizations.

14. The computer system of claim 12, wherein the visualization constructor is configured to create first layer visualization and a lower layer visualization.

15. A tangible computer-readable medium encoded with instructions, where the instructions, when executed by a computer, effect creating a plurality of visualizations, the instructions comprising:

an interface program stored on the tangible computer-readable medium configured to import data from a data stream and automatically generate an interaction rule by:
  accessing stored user preferences that specify creation of a sequence of the visualizations of the data;
  determining how the data corresponds to the stored user preferences; and
  generating the interaction rule based on the correspondence between the data and the stored user preferences;

a visualization constructor stored on the tangible computer-readable medium configured to simulate a window and to create the plurality of visualizations in the simulated window using the data stream and the interaction rule without user interaction, wherein the interaction rule specifies an order of display of the visualizations; and a display program stored on the tangible computer-readable medium configured to display the plurality of visualizations based on the interaction rule.

16. The tangible computer-readable medium of claim 15, wherein the instructions further comprise an image compositor program stored on the tangible computer-readable medium-configured to create images using the visualization.

17. A method for displaying business process data, comprising:

importing, by a processor, business process data;
accessing, by the processor, a user preference regarding the display of the business process data, wherein the user preference specifies creation of a sequence of visualizations of the business process data;
automatically generating, by the processor, an interaction rule for the business process data based on the user preference and the business process data, wherein generating the interaction rule comprises:
  determining how the business process data corresponds to the user preference;
  generating the interaction rule based on the correspondence between the business process data and the user preference;
creating, without user interaction by the processor, the visualizations of the business process data and an order of display based on the interaction rule, wherein the interaction rule specifies the order of display of the visualizations; and displaying the plurality of visualizations in the order of display.

18. The method of claim 17, wherein importing the business process data comprises importing network availability information.

19. The method of claim 17, wherein generating the interaction rule comprises generating the interaction rule which specifies creating a visualization of a service provider with a highest volume of service requests.

20. A computer system for providing a graphical representation of data, the computer system comprising:

means for importing data from a data stream;
means for selecting a subset of the data;
means including a processor for automatically generating an interaction rule for the subset of data based on predefined preferences, wherein the predefined preferences specify creation of a sequence of visualizations of the imported data, and wherein generating the interaction rule is based on determining how the subset of data corresponds to the predefined preferences;
means including the processor for creating first layer visualization using the subset of data and the interaction rule;
means including the processor for creating a lower layer visualization using the subset of data and the interaction rule;
means for creating an order of display of the first and lower layer visualizations as specified by the interaction rule; and
means for displaying the first layer visualization and the lower layer visualization with a plurality of other visualizations based on the order of display without user interaction.

21. A method for creating visualizations comprising:

importing, by a processor, a data stream;
selecting, by the processor, data from the data stream;
accessing, by the processor, a list of stored user preferences that specify creation of a sequence of visualizations of the data;
determining, by the processor, how the selected data corresponds to the stored user preferences; and
automatically generating, by the processor, an interaction rule based on the correspondence between the data and the stored user preferences;
creating, by the processor, a first layer visualization based on the interaction rule using the selected data;
generating, by the processor, an order of display according to the interaction rule; and
displaying the first layer visualization with a plurality of other visualizations in the order of display without user interaction.

22. The method of claim 21, comprising creating a second layer visualization using the selected data, wherein the second layer visualization is a drilldown from the first layer visualization.

23. The method of claim 1, wherein displaying the visualizations comprises displaying the visualizations in plural graphical user interface screens.

24. The method of claim 12, wherein the visualizations are incorporated into a slideshow to be presented in the display.

* * * * *

UNITED STATES PATENT AND TRADEMARK OFFICE
CERTIFICATE OF CORRECTION

PATENT NO. : 7,714,876 B1  Page 1 of 1
APPLICATION NO. : 11/076700
DATED : May 11, 2010
INVENTOR(S) : Ming C. Hao et al.

It is certified that error appears in the above-identified patent and that said Letters Patent is hereby corrected as shown below:

In column 9, line 42, in Claim 16, delete "medium-configured" and insert -- medium configured --, therefor.

Signed and Sealed this

Twenty-eighth Day of September, 2010

David J. Kappos
*Director of the United States Patent and Trademark Office*